(12) United States Patent
Suzuki et al.

(10) Patent No.: US 11,454,858 B2
(45) Date of Patent: Sep. 27, 2022

(54) OPTICAL DEFLECTOR

(71) Applicants: DENSO CORPORATION, Kariya (JP); National Institute for Materials Science, Tsukuba (JP)

(72) Inventors: Yosuke Suzuki, Kariya (JP); Tadaaki Nagao, Tsukuba (JP); Akio Watanabe, Tsukuba (JP)

(73) Assignees: DENSO CORPORATION, Kariya (JP); NATIONAL INSTITUTE FOR MATERIALS SCIENCE, Tsukuba (JP)

( * ) Notice: Subject to any disclaimer, the term of this patent is extended or adjusted under 35 U.S.C. 154(b) by 246 days.

(21) Appl. No.: 16/809,787

(22) Filed: Mar. 5, 2020

(65) Prior Publication Data

US 2020/0292910 A1 Sep. 17, 2020

(30) Foreign Application Priority Data

Mar. 13, 2019 (JP) .............................. JP2019-045820

(51) Int. Cl.
*G02F 1/29* (2006.01)
*G02F 1/00* (2006.01)

(52) U.S. Cl.
CPC .............. *G02F 1/29* (2013.01); *G02F 1/0018* (2013.01)

(58) Field of Classification Search
None
See application file for complete search history.

(56) References Cited

U.S. PATENT DOCUMENTS

| 2007/0285763 | A1* | 12/2007 | Li ............................. H01S 3/16 359/333 |
| 2008/0043319 | A1* | 2/2008 | Uchikawa ................. G02F 1/29 348/E9.026 |
| 2009/0219378 | A1 | 9/2009 | Nakamura et al. |
| 2010/0253996 | A1 | 10/2010 | Nakamura et al. |
| 2012/0182600 | A1* | 7/2012 | Nakamura ................ G02F 1/29 359/316 |
| 2016/0204465 | A1 | 7/2016 | Mimura et al. |
| 2017/0222287 | A1* | 8/2017 | Suzuki .................. H01M 12/08 |
| 2018/0364544 | A1 | 12/2018 | Beach et al. |
| 2019/0165546 | A1* | 5/2019 | Hogg ........................ H01S 5/34 |
| 2020/0292910 | A1* | 9/2020 | Suzuki ...................... G02F 1/29 |

FOREIGN PATENT DOCUMENTS

| JP | 2003-091026 A | 3/2003 |
| JP | 2005-015259 A | 1/2005 |
| JP | 2016-160160 A | 9/2016 |
| JP | 2017044856 A | 3/2017 |
| JP | 2017-173350 A | 9/2017 |
| WO | WO 2020251844 A1 * | 12/2020 |

* cited by examiner

*Primary Examiner* — Ryan Crockett
(74) *Attorney, Agent, or Firm* — Posz Law Group, PLC

(57) ABSTRACT

An optical deflector includes: a light transmitting portion through which a light passes; and a pair of electrodes arranged to oppose to each other with the light transmitting portion interposed therebetween. The light transmitting portion is a transparent ion conductor made of a single crystal or polycrystal. The pair of electrodes apply a predetermined voltage to the light transmitting portion to move ions inside the transparent ion conductor so as to change a traveling direction of the light passing through the light transmitting portion.

3 Claims, 7 Drawing Sheets

OPTICAL DEFLECTOR

CROSS REFERENCE TO RELATED APPLICATION

This application is based on Japanese Patent Application No. 2019-45820 filed on Mar. 13, 2019, the disclosure of which is incorporated herein by reference in its entirety.

TECHNICAL FIELD

The present disclosure relates to an optical deflector using an ion conductive material with light-transmitting property.

BACKGROUND ART

An optical deflector controls the traveling direction of light such as laser light, in which an electro-optic material with an electro-optic (EO) effect is used in a manner that the refractive index is changed by the EO effect. Note that the EO effect is a phenomenon in which the refractive index of a substance changes when an electric field is applied to the substance.

SUMMARY

According to an aspect of the present disclosure, an optical deflector includes a light transmitting portion that transmits light and electrodes arranged to oppose to each other with the light transmitting portion interposed therebetween. The light transmitting portion is a transparent ion conductor made of a single crystal or a polycrystal, and a predetermined voltage is applied to the light transmitting portion by the electrodes to move ions inside the transparent ion conductor so as to change the traveling direction of the light passing through the light transmitting portion.

DESCRIPTION OF EMBODIMENTS

Figure 1:
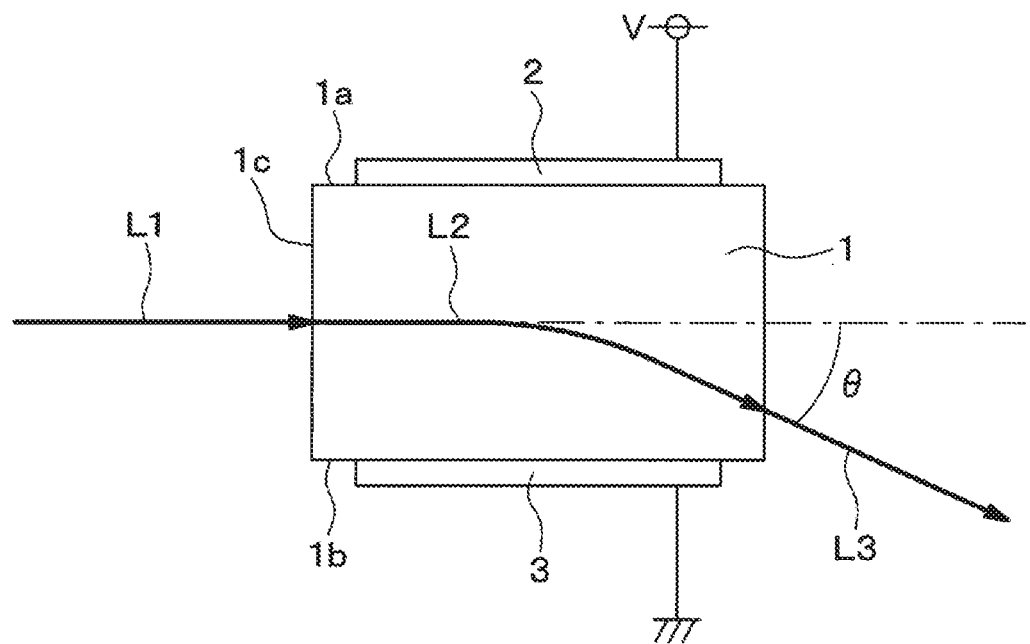
FIG. 1 is a diagram illustrating an optical deflector according to an embodiment with a state of deflection.

To begin with, examples of relevant techniques will be described.

An optical deflector controls the traveling direction of light such as laser light, in which an electro-optic material with an electro-optic (EO) effect is used in a manner that the refractive index is changed by the EO effect. Note that the EO effect is a phenomenon in which the refractive index of a substance changes when an electric field is applied to the substance.

The optical deflector includes an electro-optic material configured to transmit a laser beam or the like, and a pair of electrodes are arranged with the electro-optic material interposed therebetween. The traveling direction of light is controlled by changing the refractive index of the electro-optic material. The traveling direction of light can be controlled at high speed by this type of optical deflector having no movable part such as mirror, unlike a system that controls the traveling direction of light by moving a mirror such as galvanometer mirror.

In this type of optical deflector, incident light incident on the electro-optic material is deflected by a change in the refractive index when transmitted through the electro-optic material. Then, the deflected light is emitted as emission light, after the traveling direction is controlled. The deflection angle at which the incident light is deflected by refraction increases as the amount of change in the refractive index of the electro-optic material increases. It is preferable that the deflection light can be controlled over a wide range from the viewpoint of improving the performance of the optical deflector.

The optical deflector uses KTN (potassium tantalite niobate) or BT (barium titanate) as the electro-optic material.

However, a change in the refractive index due to the EO effect in KTN is as small as about 0.015 at a wavelength of 633 nm, for example, under the conditions of a temperature of 60° C. and an electric field strength of 500 V/mm. The change in refractive index $\delta n$ when an electric field is applied to KTN is expressed by the following Equation 1, where E is the electric field strength, $n_0$ is the refractive index of KTN, $\varepsilon_0$ is the dielectric constant in a vacuum, and $\varepsilon_r$ is the relative dielectric constant.

$$\delta n = -0.136/2 \times n_0^3 \varepsilon_0^2 \varepsilon_r^2 E^2 \qquad \text{Equation 1}$$

As shown in Equation 1, the change in refractive index $\delta n$ of KTN when an electric field is applied is proportional to the cube of the refractive index, the square of the dielectric constant in a vacuum, the square of the relative dielectric constant, and the square of the electric field. Therefore, as a method of increasing the amount of change in the refractive index of KTN, it is conceivable to increase the electric field strength E and/or the relative dielectric constant $\varepsilon_r$.

However, increasing the electric field strength E is not preferable because it means higher voltage. Further, since the relative dielectric constant $\varepsilon_r$ of KTN has temperature dependency, it is necessary to control the temperature in order to increase the relative dielectric constant $\varepsilon_r$. That is, an optical deflector using KTN is difficult to drive at a low voltage, and requires temperature control.

The electro-optic material other than KTN is, for example, BT, LN (lithium niobate), PLZT (lead lanthanum zirconate titanate) and the like, but the change in the refractive index due to the EO effect thereof is smaller than that of KTN.

The present disclosure provides an optical deflector that can be driven at a lower voltage and does not require temperature control.

According to an aspect of the present disclosure, an optical deflector includes a light transmitting portion that transmits light and electrodes arranged to oppose to each other with the light transmitting portion interposed therebetween. The light transmitting portion is a transparent ion conductor made of a single crystal or a polycrystal, and a predetermined voltage is applied to the light transmitting portion by the electrodes to move ions inside the transparent ion conductor so as to change the traveling direction of the light passing through the light transmitting portion.

Thus, an optical deflector has a light transmitting portion composed of a transparent ion conductor in which ions move in the crystal by application of an electric field. Unlike conventional electro-optic materials, this transparent ion conductor is an optical crystal that causes ions to move due to the application of an electric field, and has a large change in refractive index at a lower voltage even under normal temperature conditions. Therefore, by using this transparent ion conductor as the light transmitting portion, an optical deflector that can be driven at a lower voltage than in the past and does not require temperature control is provided.

Hereinafter, embodiments of the present disclosure will be described with reference to the drawings. In the following embodiments, the same or equivalent parts are denoted by the same reference numerals.

An optical deflector according to an embodiment will be described with reference to FIG. 1. The optical deflector is suitable for use in, for example, a lens, a prism, a mirror, a light sensing device, or the like, but may be applied to other applications. In FIG. 1, the thicknesses of a light transmitting portion 1 and electrodes 2 and 3, which will be described later, are exaggerated for easy understanding of the configuration.

(Configuration of Optical Deflector)

As shown in FIG. 1, the optical deflector of the present embodiment includes a light transmitting portion 1 that transmits light, and a first electrode 2 and a second electrode 3 opposed to each other with the light transmitting portion 1 interposed therebetween. In the optical deflector, the refractive index is changed by applying a voltage to the electro-optic material constituting the light transmitting portion 1 by the electrodes 2 and 3, so as to control the traveling direction of the light beam incident on the light transmitting portion 1.

As shown in FIG. 1, the light transmitting portion 1 has a first surface $1a$ and a second surface $1b$ in a front-to-back relationship, and a side surface $1c$ located between the first surface $1a$ and the second surface $1b$. The light transmitting portion 1 is, for example, a plate-like substrate such as a square plate.

The first electrode 2 is disposed on the first surface $1a$, and the second electrode 3 is disposed on the second surface $1b$. The light transmitting portion 1 is made of an electro-optic material having a larger change in refractive index when a low voltage is applied than a conventional electro-optic material. Specifically, the light transmitting portion 1 is made of a transparent ion conductor to be described later in detail.

The electrodes 2, 3 are connected to a driving power source V, for example, as shown in FIG. 1, and are used to apply an electric field to the light transmitting portion 1. The electrodes 2 and 3 are made of, for example, one of Au, Pd, Ni, Ir, and Pt as a main component from the viewpoint of efficiently moving carriers when an electric field is applied to the light transmitting portion 1.

The main component means a component having the largest proportion of the material constituting the first electrode 2 or the second electrode 3 as a whole. The electrodes 2 and 3 are not limited to be made of the above-described materials, and may be made of a transparent conductive material such as ITO (indium tin oxide) or ZnO, or may be made of another material.

While the basic configuration of the optical deflector of the present embodiment is explained, note that the optical deflector of the present embodiment controls the traveling direction of light by using the EO effect of the electro-optic material. The optical deflector of the present embodiment may also be referred to as "EO optical deflector".

(Operating Principle)

The operating principle of the optical deflector according to the present embodiment will be described with reference to FIG. 1. In FIG. 1, the optical axis of the incident light L1 is indicated by a single chain line.

In the optical deflector, for example, as shown in FIG. 1, the incident light L1 is applied to the light transmitting portion 1 from a light source (not shown) along a normal direction to the side surface $1c$ (hereinafter referred to as "the normal direction"). When a voltage is applied to the electrodes 2 and 3 formed on the first surface $1a$ and the second surface $1b$ respectively, the electric field is applied to the light transmitting portion 1 in the normal direction normal to the side surface $1c$, that is, in a direction perpendicular to the optical axis of the incident light L1.

When a predetermined electric field is applied to the light transmitting portion 1 by the electrodes 2 and 3, the refractive index of the transparent ion conductor constituting the light transmitting portion 1 changes due to the EO effect. At this time, the traveling direction of the light L2 that has entered the light transmitting portion 1 changes inside the light transmitting portion 1 as shown in FIG. 1. After the light L2 is deflected by the application of electric field to the light transmitting portion 1, the light L2 is emitted as an emission light L3 from, for example, a surface opposite to the side surface $1c$.

As shown in FIG. 1, the angle between the optical axis of the incident light L1 and the emission light L3 is defined as a deflection angle $\theta$. The deflection angle $\theta$ changes according to the amount of change in the refractive index in the light transmitting portion 1. The amount of change in the refractive index due to the EO effect changes according to the intensity of electric field of the light transmitting portion 1. That is, the deflection angle $\theta$ in the light transmitting portion 1 can be controlled by controlling the voltage to the electrodes 2 and 3.

The above is the basic operation principle of the optical deflector.

The optical deflector can be used in a state without temperature control, that is, at room temperature. The optical deflector can be driven at a low voltage, for example, in a range between 0 V and 8 V. The reason will be described in detail later. The term "low-voltage driving" as used in this specification means that the EO optical deflector can be driven in a voltage range that is at least one digit smaller than the voltage required for changing the refractive index in a conventional EO optical deflector. For example, the low voltage may be in a range between 2 V and 8 V.

(Transparent ion Conductor)

The transparent ion conductor will be described.

The transparent ion conductor is an optical material having optical transparency and ion conductivity, and is a single crystal or a polycrystal. The transparent ion conductor used as the light transmitting portion 1 has a gap through which ions can move in the crystal when an electric field is applied. A material having a high ion conductivity is selected as the transparent ion conductor.

For example, the transparent ion conductor includes, as a main component, an oxide having a garnet-type crystal structure represented by a composition formula of $A_3B_2C_3O_{12}$ (A, B, and C are arbitrary metal elements) such as $Li_7La_3Zr_2O_{12}$. In the present embodiment, the light transmitting portion 1 is formed of a transparent ion conductor having a cubic garnet-type crystal structure made of $Li_7La_3Zr_2O_{12}$ as a main component and doped with an element M as an impurity such as Al, Nb or Ta.

In the following, for the sake of simplicity and clarity of description, a transparent lithium ion conductor containing $Li_7La_3Zr_2O_{12}$ as a main component and doped with at least one element M selected from the group consisting of Al, Nb and Ta is simply referred to as a lithium ion conductor "LLZ".

LLZ is a crystal that is stable in air, and has high Li ion conductivity of about $2.7 \times 10^{-4}$ $Scm^{-1}$ at room temperature of about 25° C. The Li ion conductivity of the transparent ion conductor constituting the light transmitting portion 1 may be further increased by adjusting the doping concentration of the element M, if necessary. The Li ion conductivity of LLZ can be adjusted to about $1.0 \times 10^{-3}$ $Scm^{-1}$. When the light transmitting portion 1 is made with an optical material having a high ionic conductivity, it is possible to increase the amount of change in the refractive index due to the EO effect. The above configuration will be described later.

In the case where the light transmitting portion 1 is composed of LLZ as a main component, a portion of the LLZ to which the light is irradiated, for example, the side surface 1c of the light transmitting portion 1 in FIG. 1 is preferably covered with another transparent body.

Specifically, when Li in the LLZ crystal is exchanged with hydrogen derived from $H_2O$, LiOH is generated and reacts with $CO_2$ in the atmosphere to form a $Li_2CO_3$ film. As the film formation proceeds, the amount of Li that can move in the LLZ crystal decreases, and the Li ion conductivity decreases. Therefore, it is preferable that the above-mentioned Li-H exchange be prevented by covering with the transparent body and using this as a protective film.

(Method of Manufacturing LLZ Sintered Body)

A method for manufacturing the LLZ sintered body constituting the light transmitting portion 1 will be described.

A raw material for obtaining the LLZ sintered body is particles made of oxide having a cubic garnet-type crystal structure in which at least one element M selected from the group consisting of Al, Nb and Ta is solid-solved to LLZ as a matrix. Hereinafter, for the sake of simplicity, the above-mentioned particles serving as a raw material for obtaining the LLZ sintered body are referred to as "LLZ particles".

First, a Li-containing raw material containing Li, a La-containing raw material containing La, a Zr-containing raw material containing Zr, and an M-containing raw material containing M are reacted with oxycarboxylic acid in a solvent such as water or alcohol to form a metal complex. Hereinafter, this step is referred to as "first step" for convenience. Note that oxycarboxylic acid can be a ligand of a metal complex.

The Li-containing raw material is, for example, at least one raw material selected from the group consisting of nitrate, chloride, hydroxide, oxide, sulfate, carboxylate, halide, and alkoxide of Li. The Li-containing raw material contains Li in a range between 100% and 110%, preferably in a range between 102% and 105% relative to Li in the stoichiometric composition of LLZ.

The La-containing raw material is, for example, selected from the group consisting nitrate, chloride, hydroxide, oxide, sulfate, carboxylate, halide and alkoxide of La.

The Zr-containing raw material is, for example, selected from the group consisting oxynitrate, oxychloride, hydroxide, oxide, sulfate, carboxylate, halide and alkoxide of Zr.

The M-containing raw material is, for example, selected from the group consisting of nitrate, chloride, hydroxide, oxide, sulfate, carboxylate, halide and alkoxide of M.

The Li-containing raw material, the La-containing raw material, the Zr-containing raw material and the M-containing raw material are soluble in water or alcohol, and are suitable for promoting complex formation.

The oxycarboxylic acid is selected, for example, from the group consisting of citric acid, tartaric acid, malic acid, tartronic acid, glyceric acid, oxybutyric acid, hydroacrylic acid, lactic acid and glycolic acid. The citric acid is preferable because citric acid can surely promote complex formation with the above-mentioned raw material.

Subsequently, the metal complex obtained in the first step is subjected to a polymerization reaction with a polyol to obtain a metal complex polymer. Hereinafter, this step is referred to as "second step" for convenience. The second step is performed by, for example, sequentially proceeding the evaporation of the polyol of the solvent and the polymerization reaction of the esterification in a temperature range between 40° C. and 300° C.

The polyol is typically a glycol. Specifically, the polyol is selected from the group consisting of, for example, ethylene glycol, propylene glycol, trimethylene glycol, 1,4-butanediol, 1,5-pentanedial, and 1,6-hexanediol. The ethylene glycol is preferable for promoting the polymerization reaction. The ethylene glycol is inexpensive and easy to handle.

The second step may be performed in two stages of heating for evaporating the solvent and heating for performing the esterification.

The metal complex polymer obtained in the second step is fired, for example, in a temperature range between 700° C. and 800° C. Hereinafter, this step is referred to as "third step" for convenience. The third step is a step of carbonizing the metal complex polymer, removing unnecessary organic substances, and then performing thermal decomposition. The above temperature range is preferable for sequentially performing the carbonization, the removal of organic substances, and the thermal decomposition. Further, the third step is preferably performed in an atmosphere containing oxygen.

The third step may include plural firings carried out stepwise. Specifically, the third step includes a first firing for carbonization, a second firing for removing organic substances, and a third firing for thermal decomposition. In this case, the temperature range for the first firing is, for example, in a range between 300° C. and 500° C. The temperature range for the second firing is in a range between 500° C. and 700° C. The temperature range for the third firing is in a range between 700° C. and 800° C., Further, the third firing is preferably performed in an atmosphere containing oxygen.

The LLZ particles composed of an oxide having a cubic garnet-type crystal structure in which the element M is dissolved in LLZ as a base are obtained through the first to third steps. The LLZ particle has, for example, a particle size in the range of 0.3 μm to 3 μm. The LLZ particles are uniform and fine. An LLZ sintered body constituting the light transmitting portion 1 can be manufactured by using such uniform and fine particles.

A first sintering is performed using the LLZ particles as a raw material. Hereinafter, this step is referred to as "fourth step" for convenience. The fourth step is performed, for example, in a temperature range between 1100° C. and 1200° C. for a time period in a range between 0.5 hour and 50 hours by a cold hydraulic pressure forming method, a uniaxial pressure forming method, or the like. Further, the fourth step is preferably performed in an atmosphere containing oxygen. For example, the fourth step is preferably performed in an atmosphere where oxygen flows. In the first sintering in the fourth step, the LLZ particles that come into contact with each other cause a surface diffusion reaction with each other. Thus, the grain growth is caused and the pores are reduced. As a result, a molded article is obtained, which is shrunk as a whole.

The fourth step is preferably performed until the pore volume ratio of the molded article becomes 5% or less, from the viewpoint of securing the light transmittance, but is not limited to this, in order to reduce the pore volume ratio of the LLZ sintered body obtained in the next step to, for example, 0.5% or less. The pore volume ratio can be obtained, for example, by performing SEM observation after polishing a cross section of the molded body and calculating the volume ratio of pores in an SEM photograph of the obtained cross section.

Subsequently, the molded body obtained in the fourth step is subjected to a second sintering in an atmosphere containing oxygen by a hot isostatic pressing method. Hereinafter, this step is referred to as "fifth step" for convenience. The fifth step is performed, for example, in an atmosphere containing oxygen having an oxygen partial pressure of $9.8 \times 10^{-5}$ Pa/cm$^2$ or more in a temperature range of 1000° C. to 1200° C. The fifth step is performed in a pressure range of, for example, 9.8 MPa/cm$^2$ or more and 196 MPa/cm$^2$ or less, for 0.5 to 10 hours.

The fifth step is preferably performed until the pore volume ratio of the LLZ sintered body becomes, for example, 0.5% or less, from the viewpoint of securing the light transmittance, but is not limited. Thereby, the pores contained in the compact obtained in the fourth step are further removed, and a dense LLZ sintered body can be manufactured.

Figure 2:
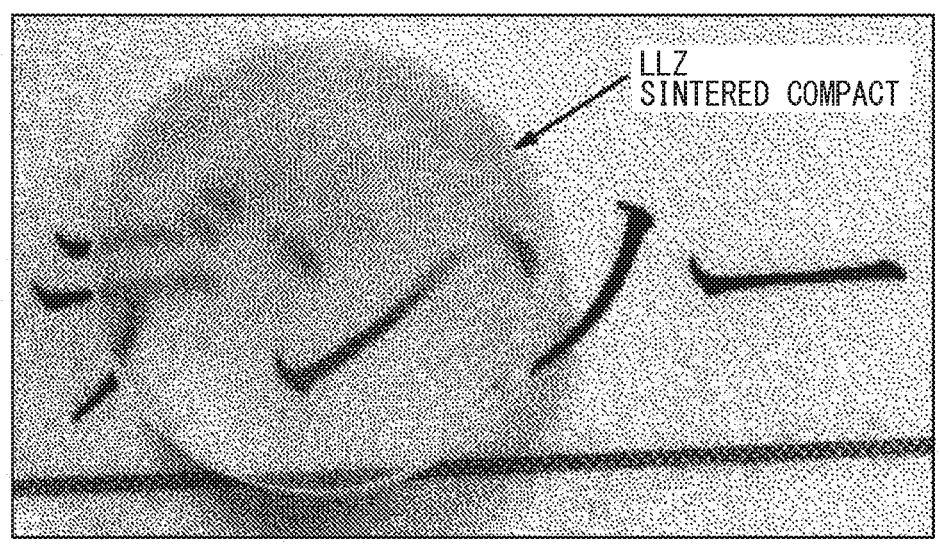
FIG. 2 is a diagram showing an LLZ sintered compact as a transparent ion conductor.

According to the above-described manufacturing method, an LLZ sintered body is obtained as an optical crystal having optical transparency as shown in FIG. 2. The LLZ sintered body shown in FIG. 2 is Al-LLZ doped with Al at a predetermined concentration, and has a relative density of almost 100%.

(Change in Refractive Index when Applying an Electric Field to LLZ)

A change in the refractive index of the LLZ sintered body obtained by the above-described manufacturing method due to the EO effect will be described with reference to FIGS. 3 to 7.

Figure 4:
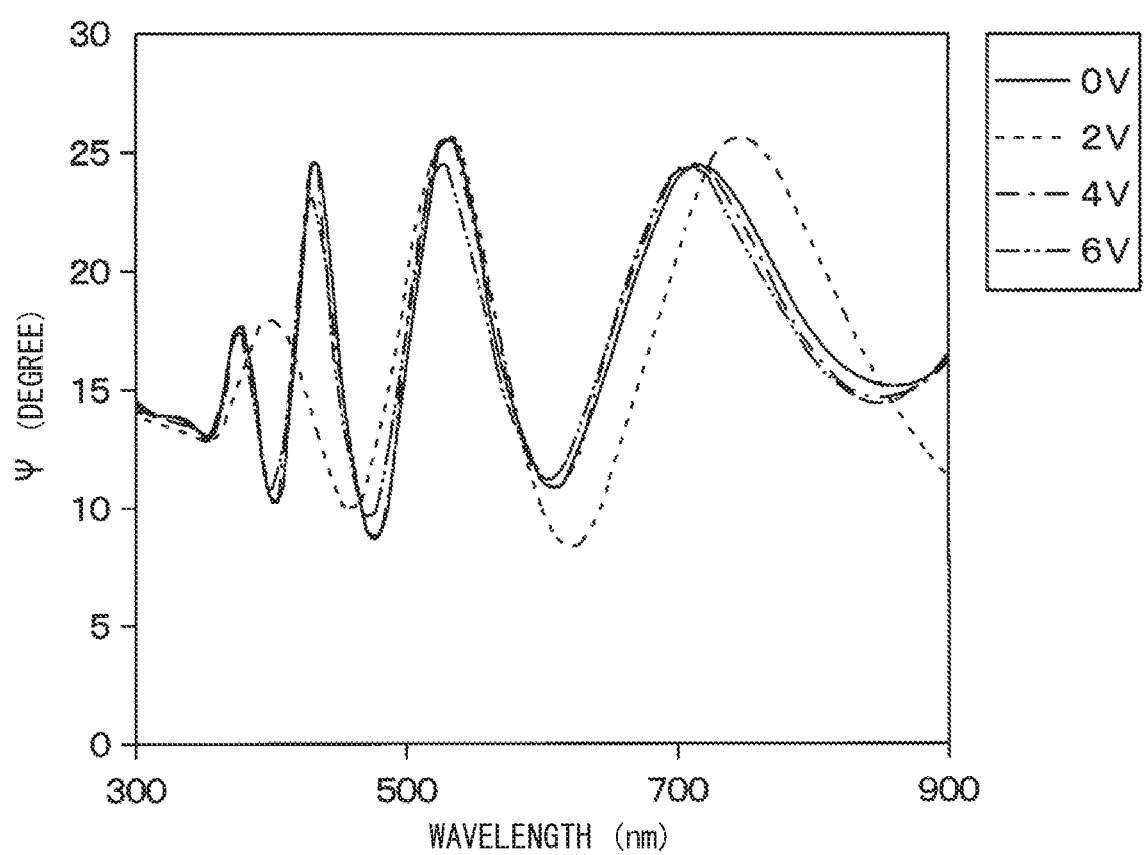
FIG. 4 is a graph showing measurement results of the sample of FIG. 3 by a spectroscopic ellipsometry method.
Figure 5:
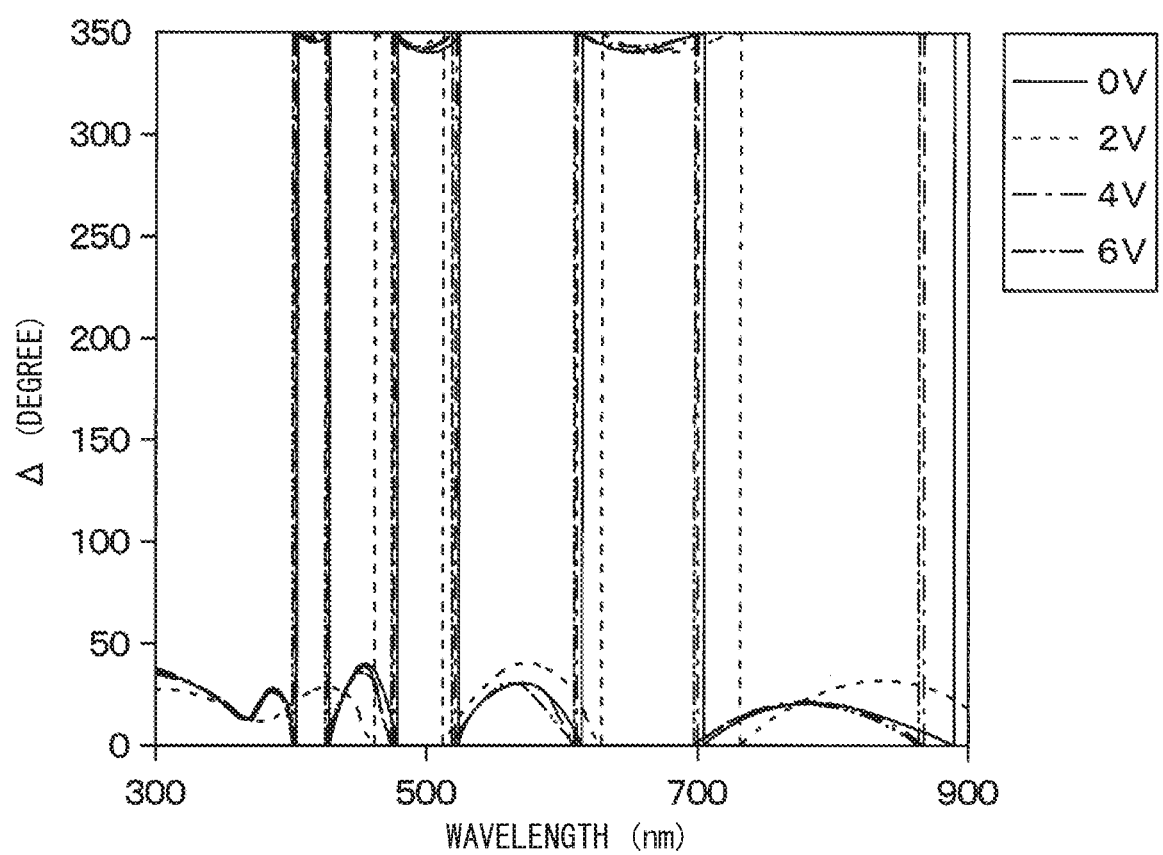
FIG. 5 is a graph showing measurement results of the sample of FIG. 3 by a spectroscopic ellipsometry method.
Figure 6:
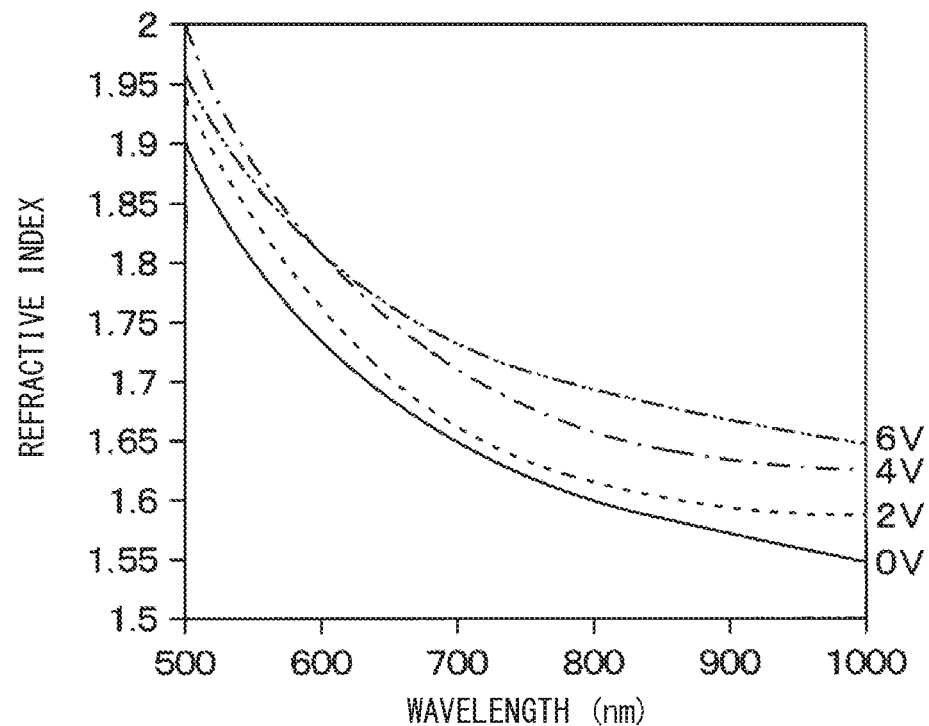
FIG. 6 is a graph showing the refractive index of the LLZ sintered body calculated using the data obtained in FIGS. 4 and 5.

The thicknesses of the LLZ sintered body 10 and the ITO electrode 11 are exaggerated in FIG. 3 in order to make it easy to understand a measurement sample and a spectroscopic ellipsometry method described later. In FIGS. 4 to 6, a solid line represents the measurement results when the voltage applied to the LLZ sintered body 10 is 0 V. A broken line represents the measurement results when the voltage applied to the LLZ sintered body 10 is 2 V. A single chain line represents the measurement results when the voltage applied to the LLZ sintered body 10 is 4 V. A double chain line represents the measurement results when the voltage applied to the LLZ sintered body 10 is 6 V.

First, a measurement sample prepared for changing the refractive index will be described.

Figure 3:
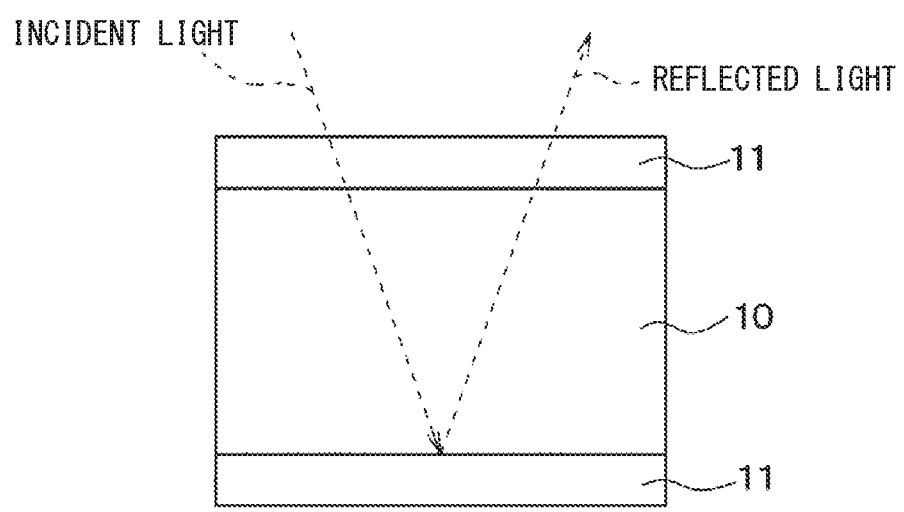
FIG. 3 is a diagram illustrating a sample for measuring optical characteristics of an LLZ sintered body and a state of light irradiation in a spectroscopic ellipsometry method.

For example, as shown in FIG. 3, a measurement sample is prepared, in which the ITO electrodes 11 are formed on the upper and lower surfaces of a plate-shaped LLZ sintered body 10. The LLZ sintered body 10 in the measurement sample has a thickness of 2.11 mm. The ITO electrode 11 in the measurement sample has a thickness of 0.5 μm. Each of the LLZ sintered body 10 and the ITO electrode 11 has a plane size of 1.98 mm×1.14 mm. The LLZ sintered body 10 has an arithmetic mean roughness Ra of less than 100 nm on the measurement surface by optical polishing. In the measurement sample, a voltage application terminal (not shown) is connected to each of the ITO electrodes 11 so that a voltage can be applied.

Next, the calculation of the refractive index of the LLZ sintered body 10 will be described.

The measurement sample is measured by a spectroscopic ellipsometry method in a temperature environment of 25° C. Specifically, in the spectroscopic ellipsometry method, as shown in FIG. 3, the ITO electrode 11 is irradiated with incident light, and the change in deflection between the incident light and the reflected light via the ITO electrode 11 and the LLZ sintered body 10 is measured.

More specifically, light is condensed in a minute range of about 0.1 mm, and light is irradiated to the surface of the ITO electrode 11 with an incident/emission angle of 20 degrees relative to a normal direction to the surface of the ITO electrode 11. Then, the applied voltage to the ITO electrode 11 is changed among 0 V, 2 V, 4 V, and 6 V, and the deflection phase difference Δ and the reflection amplitude ratio angle ψ are measured at each voltage, as shown in FIGS. 4 and 5. In addition, another sample in which an ITO film is formed on a glass substrate is separately prepared, and measurement is similarly performed by a spectroscopic ellipsometry method to obtain data of the ITO film alone. The data of the ITO film alone is needed for the calculation of the refractive index of the LLZ sintered body 10 described later in order to subtract the influence of the ITO electrode 11.

Next, fitting is performed using the three-layer model of ITO/LLZ/ITO about the data of Δ and ψ by the above measurements, and the refractive index of the LLZ sintered body 10 is calculated as shown in FIG. 6.

Specifically, the dielectric constant of ITO required for the fitting in the three-layer model is calculated by fitting with a DrudeLorentz model suitable for expressing conductive materials. The dielectric constant of LLZ is calculated by fitting using a TaucLorentz model appropriate as a dielectric, since LLZ is a material having no conductivity. The refractive index of the LLZ sintered body 10 is calculated by using the calculated dielectric constants of ITO and LLZ and the film thickness data for fitting in the above-described three-layer model.

Next, the calculated refractive index of the LLZ sintered body 10 will be described with reference to FIGS. 6 and 7.

As shown in FIG. 6, in a state where no voltage is applied, that is, in a state of 0 V, the refractive index of the LLZ sintered body 10 is, for example, 1.90 at 500 nm, 1.70 at 633 nm, and 1.55 at 1000 nm.

In the state where a voltage of 2 V is applied, the refractive index of the LLZ sintered body 10 is 1.94 at 500 nm, 1.71 at 633 nm, and 1.59 at 1000 nm. The refractive index of the LLZ sintered body 10 is large when the voltage of 2 V is applied as a whole compared with the case of 0 V.

In a state where a voltage of 4 V is applied, the refractive index of the LLZ sintered body 10 is 1.95 at 500 nm, 1.77 at 633 nm, and 1.62 at 1000 nm. The refractive index of the LLZ sintered body 10 is large when the voltage of 4 V is applied as a whole compared with the case of 2 V.

In a state where a voltage of 6 V is applied, the refractive index of the LLZ sintered body 10 is 1.99 at 500 nm, 1.78 at 633 nm, and 1.65 at 1000 nm. The refractive index of the LLZ sintered body 10 is large when the voltage of 6 V is applied in a range between 600 nm and 1000 nm compared with the case of 4 V. Further, in the range of 500 to 600 nm, the refractive index of the LLZ sintered body 10 when the voltage of 6 V is applied is larger than the case of 2 V and smaller than the case of 4 V.

Figure 7:
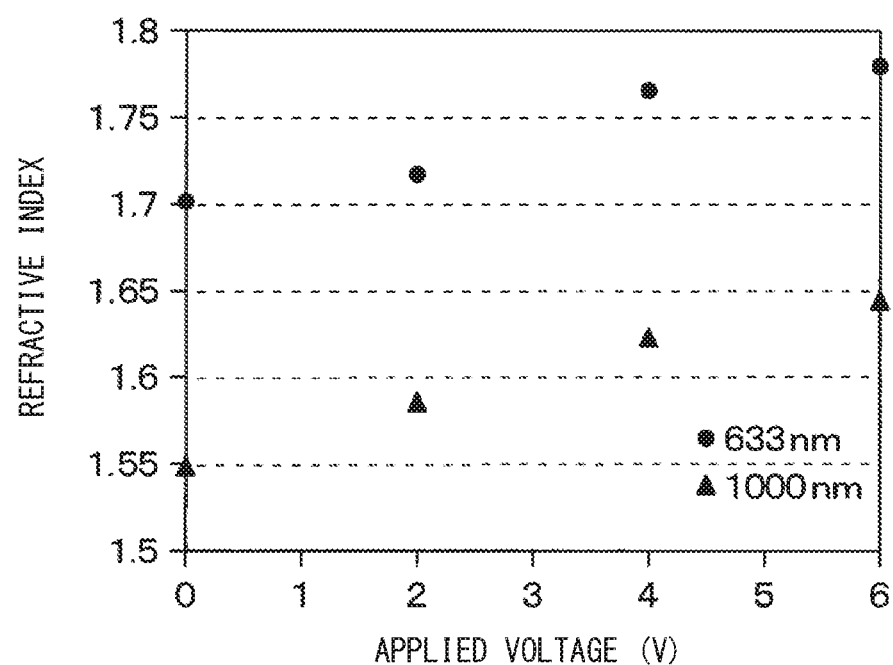
FIG. 7 is a graph showing a change in a refractive index with respect to an applied voltage of an LLZ sintered body.

As shown in FIG. 7, the refractive index of the LLZ sintered body 10 tended to increase in proportion to the applied voltage, for example, at 633 nm and 1000 nm. The degree of increase in the refractive index of the LLZ sintered body 10 with respect to the applied voltage is almost the same between 633 nm and 1000 nm. The change in the refractive index with respect to the voltage applied to the LLZ sintered body 10 having a thickness of 2.11 mm is 0.082 at 633 nm and 0.098 at 1000 nm when converted by an electric field strength of 3 V/mm.

A change in refractive index of a conventional electro-optic material KTN is 0.015 at a wavelength of 633 nm under a temperature environment of 60° C. and an electric field strength of 500 V/mm.

That is, the above results indicate that the change in the refractive index of the LLZ sintered body 10 due to the EO effect is larger than that of the conventional electro-optic material at an electric field strength of 3 V/mm, that is, even at a low voltage. Further, the change in refractive index of the LLZ sintered body 10 due to the EO effect is larger than KTN in a temperature environment of 25° C., so that temperature control for improving the change amount of refractive index becomes unnecessary. That is, the optical deflector of the present embodiment can be used under a temperature condition without temperature control, not limited to the temperature condition of 25° C., while the above example is described under the temperature condition of 25° C.

The inventors have conducted intensive studies on low-voltage driving of the EO optical deflector. As a result, the inventors found that the transparent ion conductor such as LLZ has a large change in refractive index at low intensity of electric field and does not require temperature control. The amount of change in the refractive index of the LLZ is larger than that due to the Kerr effect or the Pockels effect, and cannot be explained by these phenomena alone. Although the mechanism has not been elucidated yet, the present inventors presume that the change in the refractive index in the LLZ is larger than that in the conventional electro-optic material due to the ionic conductivity.

Figure 8:
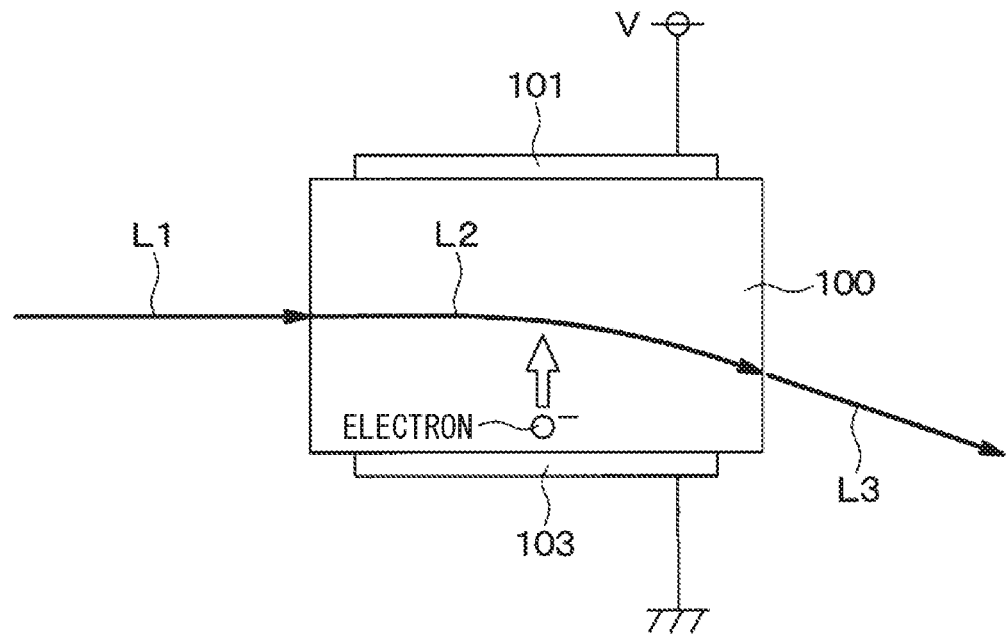
FIG. 8 is a diagram showing a state of deflection in an optical deflector of a comparison example in which KTN is used as electro-optic material.
Figure 9:
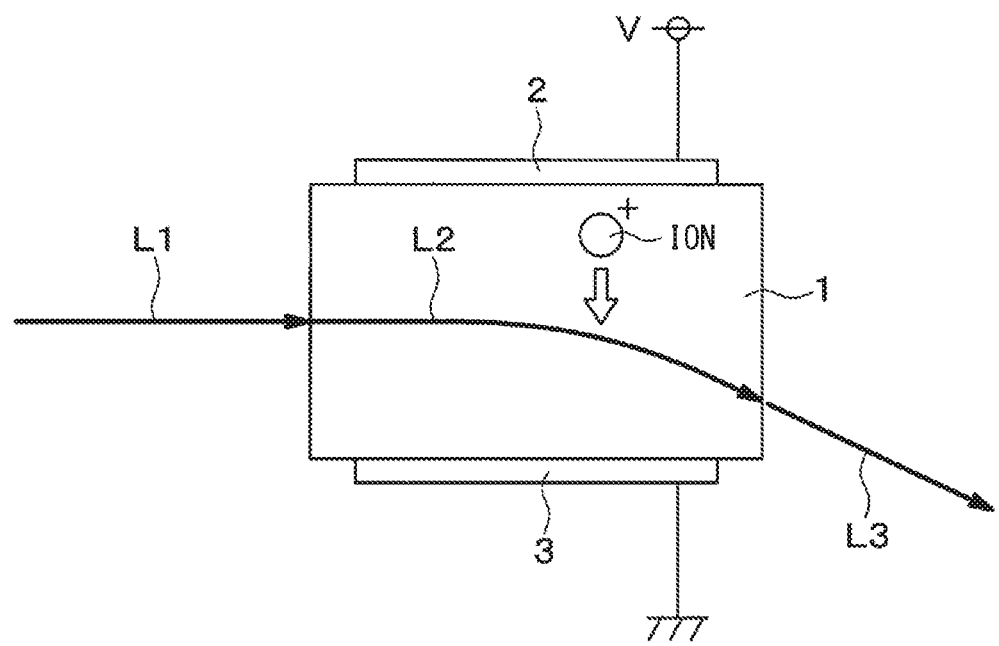
FIG. 9 is a diagram showing an estimated change in a light transmitting portion during deflection in the optical deflector of FIG. 1.

Specifically, as shown in FIG. 8, in a conventional electro-optic material such as KTN according to a comparison example, electron transfer occurs in a crystal when an electric field is applied, and the refractive index changes accordingly. In contrast, as shown in FIG. 9, when an electric field is applied, ions move in the crystal in the case of a transparent ion conductor such as LLZ, and the refractive index changes accordingly.

More specifically, LLZ is an optical crystal having a cubic garnet-type crystal structure having a sufficient space, and Li ions are capable of moving in the crystal when an electric field is applied. Presumably, Li ion migrates when an electric field is applied, and the crystal structure of LLZ has a partial change within the crystal. This change in the crystal structure is a factor that causes the change in the refractive index to be larger than that of a conventional electro-optic material such as KTN, BT, LN, or PLZT.

In other words, in the transparent ion conductor, ions larger than electrons and holes move in the crystal, causing a partial change in the crystal structure. Therefore, a change in the refractive index occurs and the amount of the change is large at a low intensity of electric field compared with a conventional electro-optic material.

According to the present embodiment, since the light transmitting portion 1 is made of a transparent ion conductor, the optical deflector can be driven at a lower voltage than in a case where a conventional electro-optic material is used. Further, the optical deflector does not require temperature control. Further, since the amount of change in the refractive index of the transparent ion conductor is larger than that of the conventional electro-optic material, the optical deflector has a deflection angle larger than that of the conventional EO optical deflector.

Other Embodiments

Although the present disclosure has been described with reference to the embodiments, it is understood that the present disclosure is not limited to the embodiments and the structures. The present disclosure includes various modifications and modifications within an equivalent range. In addition, various combinations and modes, and further, other combinations and modes including one element of these alone, or thereabove, or therebelow, are also comprised within the scope or concept range of the present disclosure.

In the embodiment, an LLZ sintered body is used as a transparent ion conductor. However, an optical crystal with a crystallographic space where ions are capable of moving in the crystal is expected to obtain a result similar to that of LLZ. Therefore, the transparent ion conductor is not limited to the LLZ, and may include, for example, $Li_5La_3Nb_{2-x}Ta_xO_{12}$ ($0 \leq x \leq 2$) or $Li_{(5+2x)}La_3Ta_{(2-x)}Y_xO_{12}$ ($0.05 \leq x \leq 0.75$) as the main component. Note that $Li_5La_3Nb_{2-x}Ta_xO_{12}$ and $Li_{(5+2x)}La_3Ta_{(2-x)}Y_xO_{12}$ can be manufactured by the same method as the above-described method of manufacturing the LLZ sintered body.

In the embodiment, the incident light L1 enters the side surface 1c of the light transmitting portion 1 where the electrodes 2 and 3 are not formed, but is not limited to this. For example, the incident light L1 may enter a part of the first surface 1a or the second surface 1b exposed from the electrode 2, 3. When one or both of the electrodes 2 and 3 are made of a transparent electrode such as ITO, the incident light L1 may enter the transparent electrode.

When the optical deflector is configured as a variable focus lens, the incident light L1 may be irradiated onto the first surface 1a or the second surface 1b of the light transmitting portion 1 exposed from the electrodes 2 and 3, while two pairs of electrodes 2 and 3 are formed in parallel. For example, the incident light L1 enters a portion of the first surface 1a exposed from the two electrodes 2, and passes through a portion of the light transmitting portion 1 between a first pair of electrodes 2, 3 and a second pair of electrodes 2, 3. That is, the light is transmitted through a portion of the light transmitting portion 1 outside the area between the electrodes. The light is emitted from the second surface 1b of the light transmitting portion 1 to the outside. At this time, when an electric field is applied to each of the two pairs of electrodes 2 and 3, an electric field is also generated in a portion of the light transmitting portion 1 outside the area between the electrodes, and the refractive index changes in the area outside the area between the electrodes. By this action, the incident light L1 applied to the portion of the first surface 1a exposed from the two electrodes 2 is collected and emitted from the second surface 1b. The optical deflector may be adopted for such an application.

Figure 10:
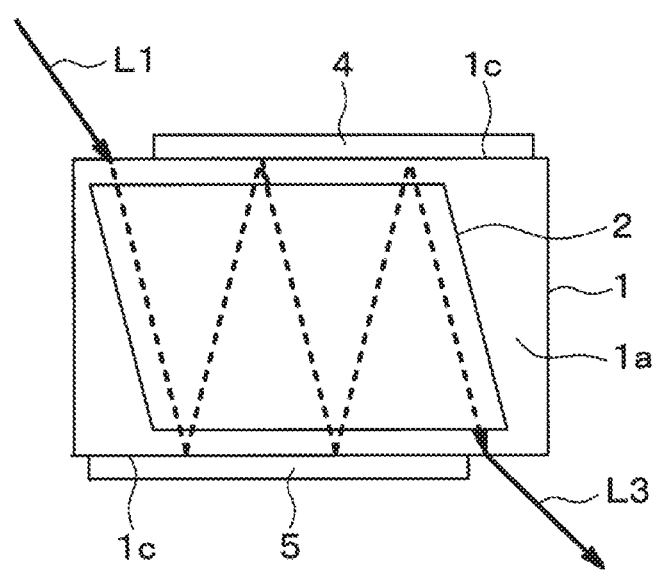
FIG. 10 is a diagram showing an optical deflector and a state of deflection in a modification of the embodiment.

In the embodiment, the optical deflector includes the light transmitting portion 1 and the electrodes 2 and 3, however, is not limited to this while the light transmitting portion 1 is formed of a transparent ion conductor. For example, as shown in FIG. 10, the optical deflector further has high reflection films 4 and 5 provided respectively to the side surfaces 1c of the light transmitting portion 1 opposite to each other where the electrodes 2 and 3 are not formed. The incident light L1 is incident into a portion of the light transmitting portion 1 exposed from the high reflection film 4, and is emitted outside from a portion of the light transmitting portion 1 exposed from the high reflection film 5. Further, the optical deflector may include two pairs of electrodes 2 and 3 to further increase the deflection angle. Thus, the optical deflector having the light transmitting portion 1 made of the transparent ion conductor is not limited to the embodiment, and an arbitrary EO optical deflector may be employed as the optical deflector having the light transmitting portion 1 made of the transparent ion conductor.

What is claimed is:

1. An optical deflector comprising:
   a light transmitting portion through which a light passes; and
   a first electrode and a second electrode arranged to oppose to each other with the light transmitting portion interposed therebetween,
   wherein
   the light transmitting portion is a transparent ion conductor made of a single crystal or polycrystal,
   the first electrode and the second electrode apply a predetermined voltage to the light transmitting portion to move ions inside the transparent ion conductor so as to change a traveling direction of the light passing through the light transmitting portion, and
   the transparent ion conductor is a lithium ion conductor having a garnet-type crystal structure containing Li, La, and Zr.

2. The optical deflector according to claim 1, wherein the transparent ion conductor is an oxide containing $Li_7La_3Zr_2O_{12}$ as a main component.

3. The optical deflector according to claim 1, wherein the electrodes are made of at least one material selected from the group consisting of Au, Pd, Ni, Ir, and Pt as a main component.

* * * * *